(12) United States Patent
Urrinkala et al.

(10) Patent No.: US 12,079,128 B2
(45) Date of Patent: Sep. 3, 2024

(54) TECHNIQUES FOR PRE-FETCHING INFORMATION USING PATTERN DETECTION

(71) Applicant: Micron Technology, Inc., Boise, ID (US)

(72) Inventors: Vanaja Urrinkala, Hyderabad (IN); Niraimathi N S, Hyderabad (IN)

(73) Assignee: Micron Technology, Inc., Boise, ID (US)

( * ) Notice: Subject to any disclaimer, the term of this patent is extended or adjusted under 35 U.S.C. 154(b) by 95 days.

(21) Appl. No.: 17/723,096

(22) Filed: Apr. 18, 2022

(65) Prior Publication Data

US 2022/0350744 A1 Nov. 3, 2022

Related U.S. Application Data

(60) Provisional application No. 63/181,760, filed on Apr. 29, 2021.

(51) Int. Cl.
*G06F 12/0862* (2016.01)

(52) U.S. Cl.
CPC .. *G06F 12/0862* (2013.01); *G06F 2212/6022* (2013.01)

(58) Field of Classification Search
CPC ............. G06F 12/0862; G06F 2212/6022
See application file for complete search history.

(56) References Cited

U.S. PATENT DOCUMENTS

| | | | |
|---|---|---|---|
| 6,253,289 B1 * | 6/2001 | Bates, Jr. ............ | G06F 12/0862 712/237 |
| 10,001,927 B1 * | 6/2018 | Trachtman ............ | G06F 3/0659 |
| 10,101,917 B1 * | 10/2018 | Agans ................. | G06F 11/3457 |
| 11,301,387 B2 * | 4/2022 | Takeuchi ............ | G06F 11/1068 |

\* cited by examiner

*Primary Examiner* — Prasith Thammavong
(74) *Attorney, Agent, or Firm* — Holland & Hart LLP

(57) ABSTRACT

Methods, systems, and devices supporting techniques for pre-fetching information using pattern detection are described. Some memory systems may support pre-fetching information, such as logical-to-physical (L2P) mapping tables, data, or both, if a sequential pattern of read commands is detected. In some examples, the memory system may store a list of logical addresses indicated by received read commands and may determine whether the list corresponds to a sequential pattern independent of intervening write-alike commands. The list may store previous logical addresses for read commands, allowing the memory system to determine whether subsequent read commands form a sequential pattern. Additionally or alternatively, the memory system may track a ratio of hibernate commands to other commands (e.g., sequential read commands) and may refrain from pre-fetching L2P mapping tables for a detected sequence if the tracked ratio satisfies (e.g., exceeds) a threshold ratio.

20 Claims, 9 Drawing Sheets

TECHNIQUES FOR PRE-FETCHING INFORMATION USING PATTERN DETECTION

CROSS REFERENCE

The present Application for Patent claims priority to U.S. Provisional Patent Application No. 63/181,760 by Urrinkala et al., entitled "TECHNIQUES FOR PRE-FETCHING INFORMATION USING PATTERN DETECTION", filed Apr. 29, 2021, which is assigned to the assignee hereof, and which is expressly incorporated by reference in its entirety herein.

FIELD OF TECHNOLOGY

The following relates generally to one or more systems for memory and more specifically to techniques for pre-fetching information using pattern detection.

BACKGROUND

Memory devices are widely used to store information in various electronic devices such as computers, user devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
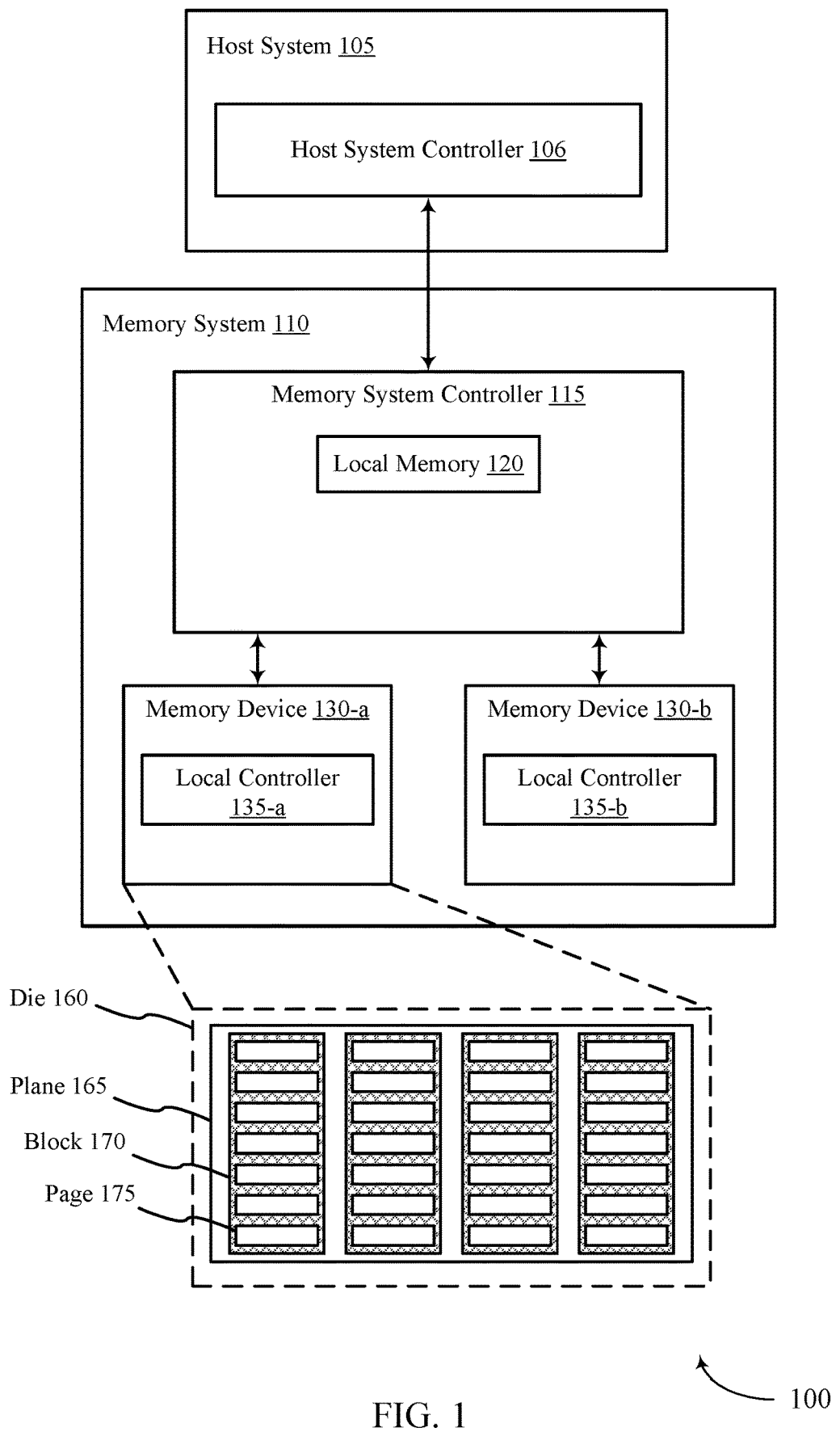
FIGS. 1 and 2 illustrate examples of systems that support techniques for pre-fetching information using pattern detection in accordance with examples as disclosed herein.

Some memory systems may support pre-fetching of information from memory devices. For example, if a memory system detects a sequential pattern of read commands, the memory system may predict a next read command in the sequence and retrieve information (e.g., a logical-to-physical (L2P) mapping table, data, or both) for the predicted read command prior to executing the read command. However, some sequences of commands executed by a memory system may result in inefficient pre-fetching techniques. For example, a pattern detection process may be reset each time a write-alike command (e.g., any command involving writing data to a memory device) is received by the memory system, even if the write-alike command is interleaved within a set of sequential read commands. Resetting the pattern detection due to the write-alike command—especially if the preceding and subsequent read commands correspond to a sequential pattern—may reduce the amount of pre-fetching performed by the memory system, effectively reducing the latency gains provided by the pre-fetching techniques. Additionally or alternatively, hibernate commands may cause the memory system to flush information, including pre-fetched information, from a cache. If a memory system executes a relatively large quantity of hibernate commands compared to sequential read commands (e.g., if the ratio of hibernate commands to sequential read commands is greater than a threshold ratio), the memory system may repeatedly pre-fetch L2P mapping tables into the cache and flush the tables out of the cache, increasing the processing overhead associated with and reducing the performance gains provided by the pre-fetching techniques.

To support efficient pre-fetching techniques, a memory system may store sequential read command data (e.g., a logical address, a command length) prior to processing a next write-alike or non-sequential read command. In some examples, the memory system may store the sequential read command data in a list of logical addresses. Instead of resetting the pattern detection if a write-alike command is received, the memory system may maintain the logical address information for at least the most recent sequential read command in the list of logical addresses, such that the memory system may determine whether a subsequently received read command corresponds to the next command in the sequence. By maintaining pattern detection for a set of sequential read commands despite receiving one or more intervening write-alike commands, the memory system may increase the likelihood of detecting a sequential pattern and, correspondingly, increase an amount of pre-fetching performed by the memory system. Increasing the amount of pre-fetching performed by the memory system may improve the performance of the memory system and reduce the latency involved in reading sequential data.

Additionally or alternatively, a memory system may track a ratio of hibernate commands to other commands (e.g., sequential read commands or any other commands). If the memory system detects a sequential pattern but determines that the ratio of hibernate commands to other commands satisfies (e.g., exceeds) a threshold ratio, the memory system may refrain from pre-fetching information (e.g., L2P mapping tables) to avoid repeatedly pre-fetching and flushing the information. For example, each hibernate command may flush any pre-fetched tables from a cache, such that the memory system may re-fetch the tables for a next sequential read command. A significant ratio of hibernate commands to sequential read commands may result in repeated pre-fetching and flushing of the L2P mapping tables. By tracking the ratio and refraining from pre-fetching the tables if the memory system performs a significant quantity of hibernate commands (e.g., above the threshold ratio), the memory system may mitigate redundant or excessive pre-fetching procedures, improving the performance of the memory system.

Figure 2:
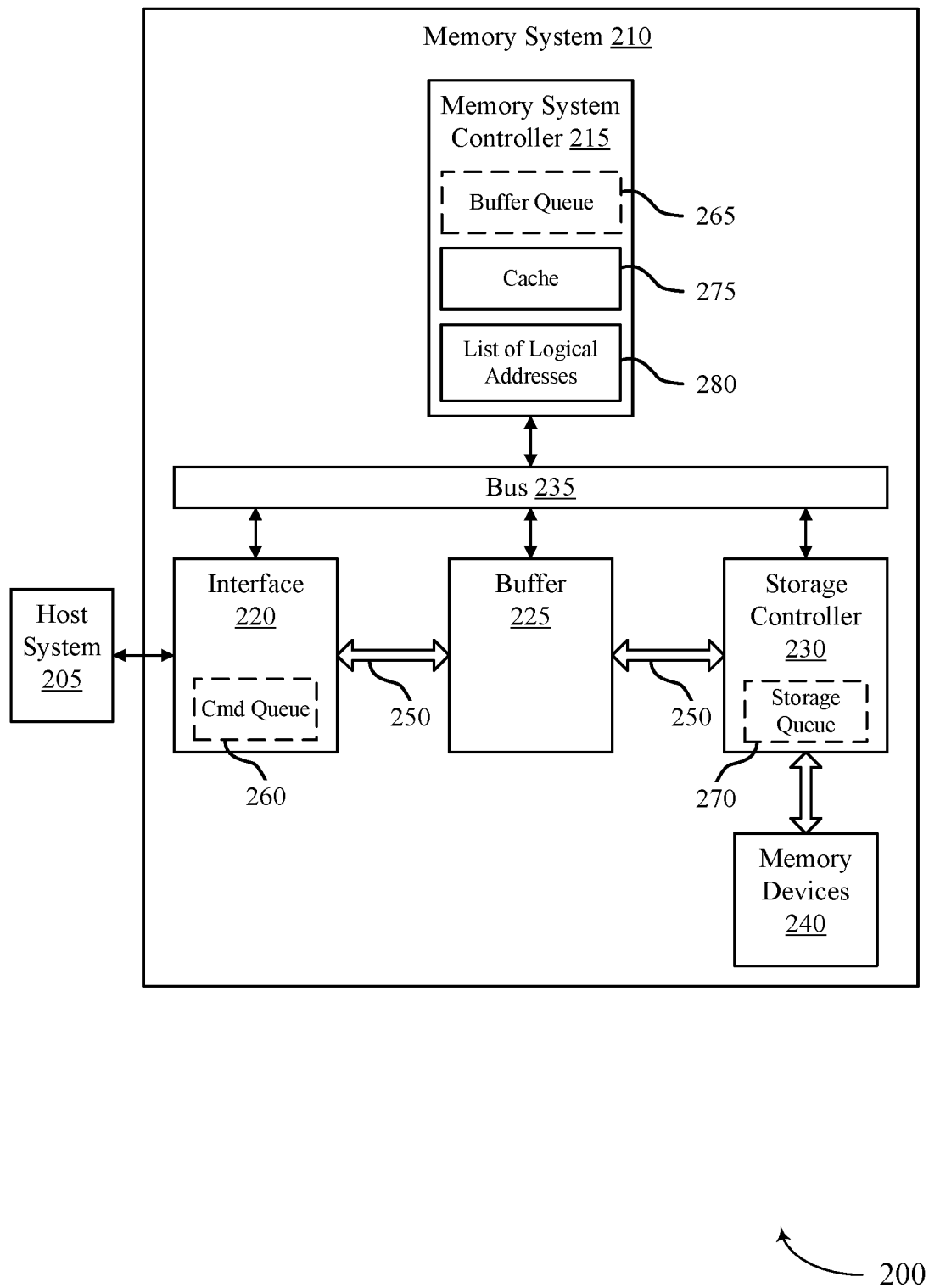

Features of the disclosure are initially described in the context of systems and devices with reference to FIGS. 1 and 2. Features of the disclosure are additionally described in the context of sets of commands and process flows with reference to FIGS. 3 through 6. These and other features of the disclosure are further illustrated by and described in the context of an apparatus diagram and flowcharts that relate to techniques for pre-fetching information using pattern detection with reference to FIGS. 7 through 9.

FIG. 1 illustrates an example of a system 100 that supports techniques for pre-fetching information using pattern detection in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165

(e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update an L2P mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

The system 100 may include any quantity of non-transitory computer readable media that support techniques for pre-fetching information using pattern detection. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

Some memory systems 110 may support pre-fetching of information (e.g., data, L2P mapping tables) from a memory device 130. Pre-fetching may involve retrieving information for a subsequent access command (e.g., read command) prior to executing the access command. For example, if the memory system 110 detects that a set of read commands includes sequential read commands—where one read command ends at a first logical address (e.g., LBA) and the next read command starts at the next logical address (e.g., LBA) after the first logical address—the memory system 110 may predict the L2P mapping table, data, or both for a next read command in the sequence. Accordingly, the memory system 110 may fetch (e.g., retrieve) the predicted L2P mapping table, data, or both from a memory device 130 prior to executing the next read command and may store the L2P mapping table, data, or both in a cache (e.g., the local memory 120 at the memory system controller 115). The memory system 110 may reduce the latency involved in executing a read command if the L2P mapping table, data, or both for the read command has been pre-fetched and is stored locally at the cache, because reading data from the cache may involve relatively lower latency than reading data from a memory device 130.

However, some sequences of commands executed at the memory system 110 may result in inefficient pre-fetching techniques. For example, if pre-fetching involves detecting a sequential LBA pattern in sequential commands, the pattern detection may be reset each time a write-alike command is received by the memory system 110 (e.g., even if the read commands received by the memory system 110 from the host system 105 are sequential). A write-alike command may be an example of any command involving writing data to a memory device 130, such as a write command, an unmap command, a format unit command, a security protocol out command, a start stop unit command, or any other command involving a write operation. A write-alike command may be an example of an unmapped command (e.g., where the command does not indicate a specific logical address in a memory device 130). Resetting the pattern detection, even if the read commands correspond to a sequential pattern, may reduce the likelihood that the memory system 110 triggers pre-fetching, reducing the latency gains supported by the pre-fetching techniques. Additionally or alternatively, hibernate commands may cause the memory system 110 to flush information from the cache. If a memory system 110 executes a relatively large quantity of hibernate commands compared to sequential read commands (e.g., if the ratio of hibernate commands to sequential read commands is greater than a threshold ratio), the memory system 110 may repeatedly pre-fetch L2P mapping tables into the cache and flush the tables out of the cache, reducing performance gains associated with the pre-fetching techniques.

To support efficient pre-fetching techniques, the memory system 110 may store sequential read command data (e.g., a logical address, a command length) prior to processing a next write-alike or non-sequential read command. In some examples, the memory system 110 may store the sequential read command data at the memory system controller 115 (e.g., in the local memory 120). Rather than resetting the pattern detection if a write-alike command or a quantity of non-sequential read commands less than a threshold quantity are received, the memory system 110 may maintain logical address information for at least the most recent sequential read command such that the memory system 110 may determine whether a subsequently received read command corresponds to the next command in the sequence. By maintaining pattern detection despite receiving one or more write-alike commands, non-sequential read commands, or both from the host system 105, the memory system 110 may increase the likelihood of detecting a sequential pattern and, correspondingly, triggering pre-fetching of data. Increasing the quantity of pre-fetching performed by the memory system 110 may improve the performance of the memory system 110.

Additionally or alternatively, the memory system 110 may track a ratio of hibernate commands to other commands (e.g., sequential read commands or any other commands). If the memory system 110 detect a sequential pattern, but determines that the ratio of hibernate commands to other commands satisfies a threshold ratio, the memory system 110 may refrain from pre-fetching information (e.g., L2P mapping tables, data, or both) to avoid repeatedly pre-fetching and flushing the information. Refraining from pre-fetching the information if the memory system 110 performs a significant quantity of hibernate commands (e.g., above the threshold ratio) may improve the performance of the memory system 110 and mitigate redundant or excessive pre-fetching procedures.

FIG. 2 illustrates an example of a system 200 that supports techniques for pre-fetching information using pattern detection in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received using the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, that the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

In some examples, the memory system controller 215 or another component (e.g., the buffer 225) of the memory system 210 may include a cache 275. The cache 275 may be an example of an SRAM cache. The cache 275 may temporarily store information for the memory system 210 for relatively low-latency retrieval (e.g., as compared to retrieving information stored in a memory device 240). The memory system 210 may retrieve information from a memory device 240 and store the information in the cache 275. If a read command indicates to retrieve the information, the memory system 210 may retrieve the information from the cache 275 instead of from a memory device 240 to reduce the latency involved with reading the information. For example, the memory system 210 may pre-fetch information (e.g., L2P mapping tables, data, or both) from one or more memory devices 240, store the pre-fetched information in the cache 275, and use the information from the cache 275 to execute one or more sequential read commands.

The cache 275 may be an example of non-persistent memory resources. For example, if the memory system 210 loses power or otherwise enters a low power state (e.g., a relatively low power state, in which the memory system 210 is idle), the cache 275 may fail to maintain information in memory resources. In some cases, the memory system 210 may support hibernate commands. A hibernate command—which may be referred to as an H8 command—may trigger the memory system 210 to enter a low power state for energy savings. The memory system 210 may execute a hibernate command if the memory system 210 is inactive for a threshold duration, does not have pending access commands in the command queue 260, or both. If the memory system 210 executes a hibernate command, prior to entering the low power state, the memory system 210 may flush information from the cache 275 back into one or more memory devices 240. For example, if information stored in the cache 275 is different than information stored in the memory devices 240, the memory system 210 may update the memory devices 240 with the latest information from the cache 275 prior to entering the low power state. Once the memory system 210 enters the low power state (e.g., in response to executing the hibernate command), the memory system 210 may lose the information stored in the cache 275, such that the cache 275 may be empty upon reentering a high power state (e.g., a relatively high power state compared to the low power state). As such, entering the low power state may remove pre-fetched information from the cache 275. In some cases, entering the low power state may involve reducing a clock speed for one or more processing components (e.g., CPUs) to reduce the power overhead for the memory system 210. Additionally or alternatively, the memory system 210 may store a ratio of hibernate commands executed to other commands (e.g., sequential read commands or any other commands) executed to determine whether to pre-fetch and store L2P mapping tables in the cache 275. In some cases, the ratio may be stored in retention RAM, such that the ratio is maintained if the memory system 210 enters a low power mode.

To support efficient pre-fetching techniques, the memory system 210 may store a list of logical addresses 280 to track a sequential pattern of read commands. For example, the memory system 210 may store the list of logical addresses 280 at the memory system controller 215 (e.g., in SRAM or retention RAM), an interface 220 (e.g., firmware front-end), or some other component of the memory system 210. If the list of logical addresses 280 is stored in retention RAM, the memory system 210 may maintain sequence tracking (e.g., a count value, a logical address for the most recent sequential read command) even if the memory system 210 enters a low power mode. The list of logical addresses 280 may store LBAs for a set of read commands, command sizes for the set of read commands, a default command size for the set of read commands, or some combination thereof. If the memory system 210 executes a read command corresponding to a sequence (e.g., reading data from a next set of LBAs following the LBAs read for the preceding read command), the memory system 210 may add the LBA, command size, or both to the list of logical addresses 280. If the memory system 210 executes one or more write-alike commands, one or more non-sequential read commands, or a combination thereof, the memory system 210 may maintain the list of logical addresses 280 in memory for a threshold quantity of non-sequential commands, a threshold duration, or both. Accordingly, if the memory system 210 executes a read command sequential to the pattern of LBAs in the list of logical addresses 280 following one or more non-sequential commands (e.g., write-alike commands, non-sequential read commands), the memory system 210 may update the list of logical addresses 280 using the read command and may continue tracking a quantity of read commands for detecting a sequential pattern (e.g., without resetting the tracking). In some examples, the memory system 210 may store a count value tracking the quantity of sequential read commands for pattern detection (e.g., with the list of logical addresses 280). In some such examples, the list of logical addresses 280 may include a single LBA, command size, or both for the most recently executed read command in the sequence. In some other examples, the list of logical addresses 280 may include multiple slots for LBAs (e.g., a quantity of slots equal to a threshold quantity for pattern detection), and the memory system 210 may determine that the read commands correspond to a sequential pattern if the slots for the list of logical addresses 280 are filled with sequential read commands.

If the memory system 210 detects a sequential pattern of read commands (e.g., using the list of logical addresses 280 to mitigate interruptions to pattern detection), the memory system 210 may trigger pre-fetching of information for subsequent read commands according to the sequential pattern. For example, using a most recently executed read command in the pattern (e.g., the start LBA and command size or the end LBA for the most recent read command), the memory system 210 may predict the start LBA, the command size, or both for the next read command to execute by the memory system 210. Accordingly, the memory system 210 may execute a pre-fetch command and may pre-fetch (e.g., read) information (e.g., the corresponding L2P mapping table, the data to retrieve) predicted for the next read command in the sequence from one or more memory devices 240 and may store the information in the cache 275. If the memory system 210 executes the next read command in the sequence, the memory system 210 may read the information from the cache 275, as opposed to from the memory devices 240, reducing latency involved in executing the read command.

Figure 3:
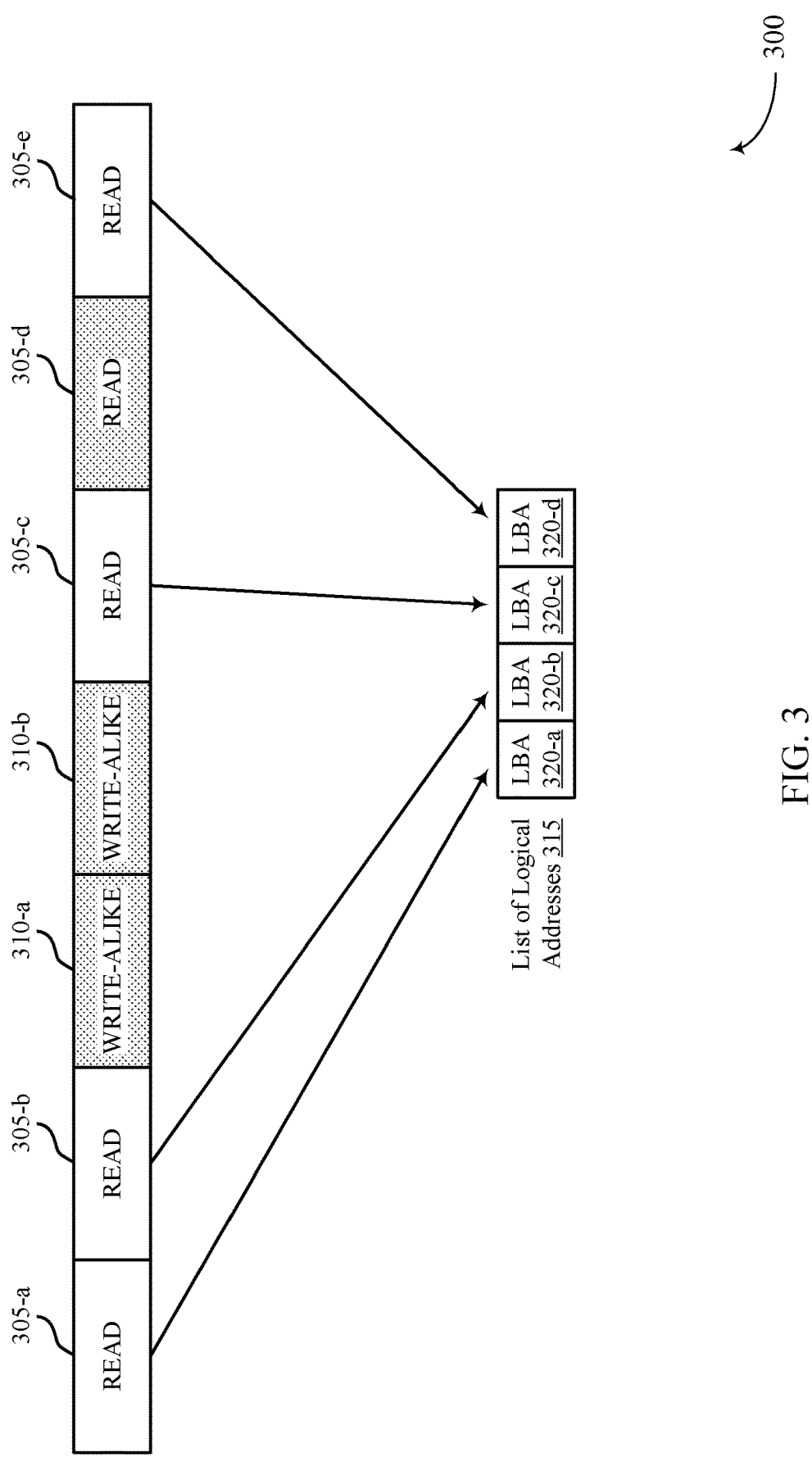
FIG. 3 illustrates an example of a set of commands that supports techniques for pre-fetching information using pattern detection in accordance with examples as disclosed herein.

FIG. 3 illustrates an example of a set of commands 300 that supports techniques for pre-fetching information using pattern detection in accordance with examples as disclosed herein. The set of commands 300 may be received and executed by a memory system, such as a memory system 110 or 210 as described with reference to FIGS. 1 and 2. The memory system may store a list of logical addresses 315 tracking sequential read commands from the set of commands 300, where the list of logical addresses 315 may be an example of a list of logical addresses 280 as described with reference to FIG. 2. For example, the memory system may store the list of logical addresses 315 in retention RAM and may determine whether the set of commands 300 includes a sequential pattern of read commands. If the memory system detects a sequential pattern, the memory system may trigger pre-fetching of data from one or more memory devices (e.g., memory devices 130 or 240 as described with reference to FIGS. 1 and 2).

In some other systems, pattern detection for sequential read commands may fail if a write-alike command or a non-sequential read command (e.g., a pre-read conflict command) is executed by a memory system. For example, the memory system may remove an executed command from a command buffer once execution is complete, once execution of the next command starts, or both. As such, the memory system may not maintain information about a previously executed command after starting execution of a subsequent command. The memory system may access the LBA and command size for a command executed directly prior to a new command to determine whether the new command corresponds to a sequential pattern of read commands, but if the memory system performs any intervening commands (e.g., write-alike commands, non-sequential read commands), the memory system may no longer store the LBA and command size for the most recent—but not directly preceding—read command in the sequential pattern. For example, the memory system may lose any information (e.g., pre-read data, information related to the most recently executed command) currently stored in a cache in response to executing a write-alike command. Accordingly, the memory system may not store the information that supports a comparison to determine whether a new read command is sequential to the most recent sequential read command, causing the memory system to reset pattern detection (e.g., reset a quantity of sequential read commands to zero).

In contrast, a memory system using a list of logical addresses 315 may maintain pattern detection even if one or more write-alike commands, non-sequential read commands, or both are executed. The memory system may maintain read command LBA values, command lengths, or both in the list of logical addresses 315. The size of the list of logical addresses 315 may depend on a threshold, X, for pattern detection. For example, the memory system may determine that a set of read commands corresponds to a sequential read pattern if a quantity of read commands in the sequence is greater than or equal to X. The list of logical addresses 315 may include a length X (e.g., a quantity of slots for storing LBA information equal to X). In some examples, the memory system may trigger pre-fetching (e.g., pre-reading) of data if the sequential read pattern is detected. In some other examples, the memory system may trigger pre-fetching of data if the sequential read pattern is detected and after executing a second threshold quantity of commands, Y (e.g., Y additional sequential read commands following pattern detection or Y total sequential read commands). Detecting the sequential pattern may be independent of the command lengths for the sequential read commands (e.g., to support any chunk size for read operations, such as a maximum buffer size, 1280 kilobytes (kB)). Additionally or alternatively, detecting the sequential pattern may be independent of memory die misalignment.

The memory system may track sequential read information using the list of logical addresses 315. For example, the memory system may receive and execute a first read command 305-a and a second read command 305-b. The memory system may determine whether the second read command 305-b is sequential to the first read command 305-a. A "sequential" read command may correspond to a read command starting a read operation at an LBA directly subsequent to the last LBA read by the read operation for a preceding read command. For example, if the first read command 305-a indicates a start LBA value of 0 and a command length of 512 kB (e.g., corresponding to 128 LBAs if an LBA corresponds to 4 kB), the last LBA read by the first read command 305-a may be LBA 127. Accordingly, if the second read command 305-*b* indicates a start LBA value of 128, the second read command 305-*b* may be sequential to the first read command 305-*a*. The memory system may store the LBAs 320 (e.g., start LBAs or end LBAs) for the sequential read commands 305 in the list of logical addresses 315. For example, the memory system may determine and store the end LBA 320-*a* for the first read command 305-*a* and the end LBA 320-*b* for the second read command 305-*b* in the list of logical addresses 315. Alternatively, the memory system may store the start LBA 320-*a* for the first read command 305-*a* and the start LBA 320-*b* for the second read command 305-*b*, along with an indication of the command lengths for the first read command 305-*a* and the second read command 305-*b*. In some cases, the memory system may store a command length specific to each read command 305 with the corresponding LBA 320. In some other cases, the memory system may store a default command length for read commands 305 in the set of commands 300.

If the memory system receives a write-alike command, the memory system may refrain from resetting the sequential pattern count. For example, the memory system may receive and execute a write-alike command 310-*a*, a write-alike command 310-*b*, or both. The memory system may refrain from resetting the pattern detection until receiving a read command (or a set of read commands) failing the sequential condition. If the memory system receives a read command 305 following the one or more intervening write-alike commands 310, the memory system may check whether the start LBA 320 for this next read command 305-*c* is sequential to the previous read command 305-*b* (e.g., due to the memory system saving read command data for the previous read command 305-*b* before processing the one or more write-alike commands 310). The memory system may use the information stored in the list of logical addresses 315 (e.g., the LBA 320-*b* for the most recently executed read command in the sequential pattern) to determine whether the read command 305-*c* following the one or more write-alike commands 310 is sequential to the preceding read command 305-*b*. In some cases, the memory system may implement Equation 1 to determine whether the new read command 305-*c* fails the sequential pattern:

$$\text{NewCommand.lba!=PreCommand.lba+PreCommand.tranferlen} \quad (1)$$

The PreCommand may correspond to the preceding sequential read command 305-*b*, the NewCommand may correspond to the new read command 305-*c*, the lba may indicate a start LBA 320 for each command, and the transferlen may indicate the command length.

If the new read command 305-*c* fails the sequential pattern, the memory system may reset the count for sequential pattern detection and, in some cases, may remove or overwrite the sequential information stored in the list of logical addresses 315. If the read command 305-*c* follows the sequential pattern, the memory system may increment the count for sequential pattern detection (e.g., avoiding resetting the count in response to the intervening write-alike command(s) 310) and may add the LBA 320-*c*, the command length, or both for the new read command 305-*c* to the list of logical addresses 315. In some examples, the memory system may determine that a sequential pattern is detected in response to the sequential read command 305-*c* following the one or more write-alike commands 310. In some other examples, the memory system may determine whether the count value satisfies a threshold, X, for sequential pattern detection.

By maintaining the count for sequential pattern detection using the list of logical addresses 315—and despite any intervening write-alike commands 310—the memory system may trigger pre-fetching (e.g., pre-reading) of data for sequential read commands 305 even if the set of commands 300 includes a mix of read commands 305 and write-alike commands 310 without waiting for a quantity of consecutive read commands (without any intervening write-alike commands 310) to satisfy the X threshold. As such, the memory system may operate using pre-fetching techniques for a greater proportion of time (e.g., as compared to a system not using the list of logical addresses 315), improving the performance of the memory system. Additionally, the memory system may refrain from dropping pre-fetched data from a buffer or cache while executing the write-alike commands 310 to support efficient execution of a sequential read command 305 following the write-alike commands 310.

In some examples, if the memory system receives a non-sequential read command 305-*d*, the memory system may reset the count for sequential pattern detection. For example, the memory system may set the count to zero, remove the stored information for sequential read commands 305 from the list of logical addresses 315, or both. In some other examples, the memory system may support a threshold quantity of non-sequential read commands without losing track of a sequential pattern. For example, the memory system may determine that the read command 305-*d* is non-sequential to read command 305-*c*. The memory system may refrain from incrementing the count for sequential pattern detection but may maintain the information related to the sequential read commands 305 in the list of logical addresses 315. If a following read command 305-*e* is sequential to the most recent sequential read command 305-*c*, the memory system may increment the count, store the LBA 320-*d*, command length, or both for the sequential read command 305-*e* in the list of logical addresses 315, or both. Accordingly, the memory system may account for up to a threshold quantity of non-sequential read commands 305 without losing track of a sequential pattern (e.g., to handle one-off or a relatively small quantity of non-sequential read commands 305 interleaved within a sequential pattern of read commands 305).

Figure 4:
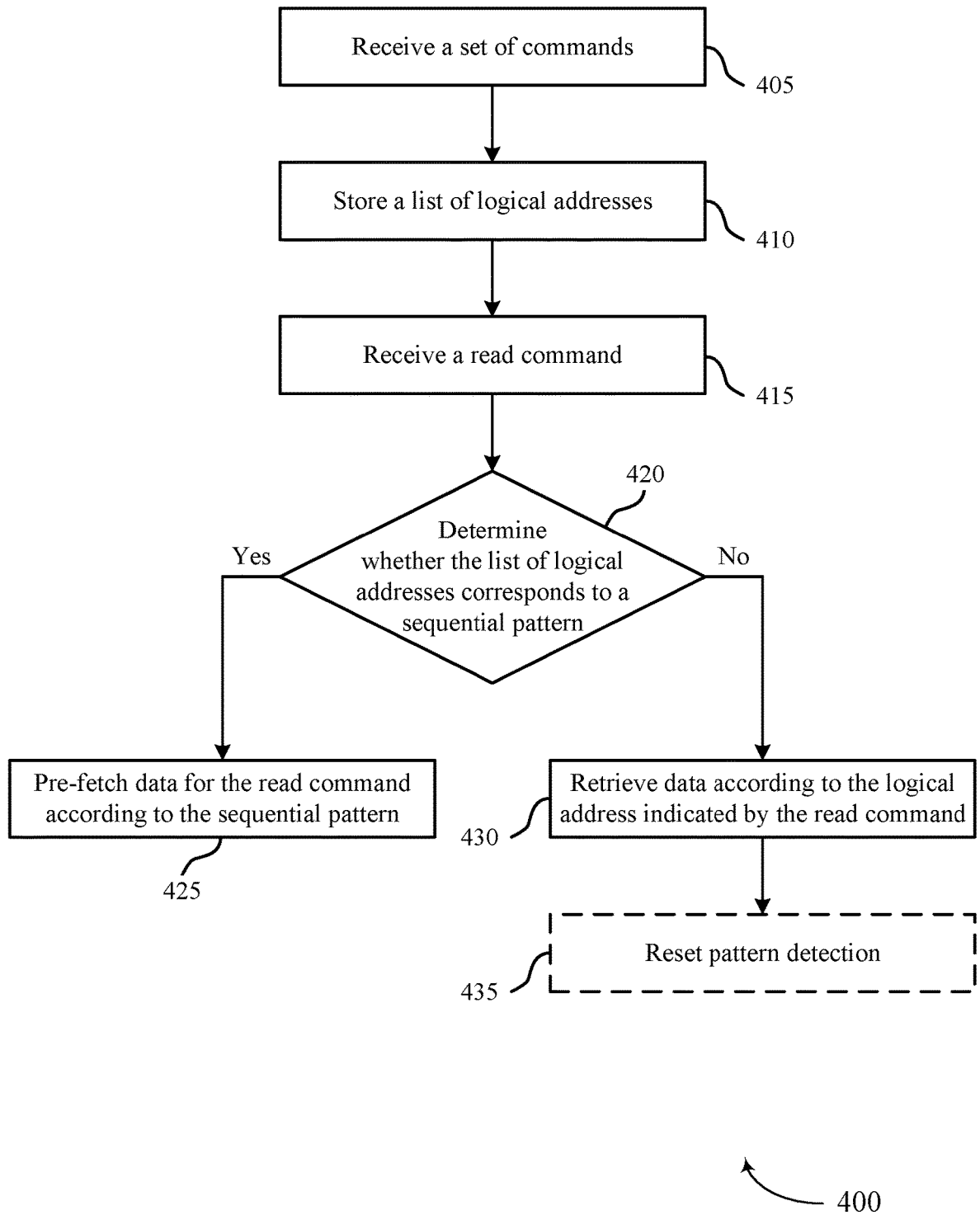
FIG. 4 illustrates an example of a process flow that supports techniques for pre-fetching information using pattern detection in accordance with examples as disclosed herein.

FIG. 4 illustrates an example of a process flow 400 that supports techniques for pre-fetching information using pattern detection in accordance with examples as disclosed herein. The process flow 400 may be implemented by a memory system, such as a memory system 110 or 210 as described with reference to FIGS. 1 and 2. The memory system may use a list of logical addresses to track sequential read commands, as described with reference to FIGS. 1 through 3. By using the list of logical addresses, the memory system may maintain read command pattern detection despite one or more intervening write-alike commands, non-sequential read commands, or both. In some cases, alternative examples of the following may be implemented, where some operations may be performed in a different order than described or are not performed at all. Additionally or alternatively, operations may include additional features not mentioned below, or further processes may be added.

At 405, a set of commands is received. For example, a memory system may receive, from a host system, a set of commands including one or more read commands and one or more write-alike commands. Each of the write-alike commands may be associated with at least one corresponding write operation by a memory device. For example, the one or more write-alike commands may include a write command, an unmap command, a format unit command, a security protocol out command, a start stop unit command, or any combination thereof.

At 410, a list of logical addresses is stored. For example, the memory system may store a list of logical addresses indicated by the set of read commands according to an order of execution for the set of read commands. The memory system may store information for a read command in the list (e.g., in RAM) if the read command corresponds to a sequential pattern of read commands. In some examples, the memory system may store a start LBA for each identified sequential read command in the list of logical addresses. In some cases, the memory system may store, with the list of logical addresses, a list of respective transfer lengths for the set of read commands. Additionally or alternatively, the memory system may determine a common transfer length for the set of read commands and may store, with the list of logical addresses, an indication of the common transfer length.

At 415, a read command is received. For example, the memory system may receive an additional read command after storing previous sequential read command information in the list of logical addresses.

At 420, it is determined whether the list of logical addresses corresponds to a sequential pattern. For example, the memory system may determine whether the list of logical addresses corresponds to a sequential pattern of read commands using the logical addresses indicated by the set of read commands, respective transfer lengths for the set of read commands, or both. In some examples, the memory system may determine whether a quantity of sequential read commands in the set of read commands satisfies a threshold value (e.g., X) for pattern detection using the list of logical addresses. In some cases, the memory system may track a count value for sequential read commands and may compare the tracked count value to the threshold value for pattern detection. In some other cases, the list of logical addresses may include a quantity of slots equal to the threshold value for pattern detection, and the memory system may determine whether the list corresponds to a sequential pattern of read commands depending on whether each slot of the list stores a sequential logical address.

If the memory system determines that the list of logical addresses corresponds to a sequential pattern, at 425, data is pre-fetched for the read command. For example, the memory system may pre-fetch (e.g., pre-read) data from a memory device for a subsequent read command according to the sequential pattern. The memory system may read the data from the memory device prior to executing the subsequent read command by predicting the data indicated by the subsequent read command according to the sequential pattern. For example, the memory system may execute a pre-fetch command indicating a next LBA according to the sequential pattern and may store the retrieved data in a cache or buffer. In some examples, the memory system may track a second count value for sequential read commands in response to determining that the list of logical addresses corresponds to a sequential pattern and may trigger the pre-fetching if the second count value satisfies a second threshold value (e.g., Y) for pre-fetch triggering. The memory system may use the pre-fetched data during execution of the subsequent read command to reduce execution latency.

If the memory system determines that the list of logical addresses fails to correspond to a sequential pattern, at 430, data is retrieved according to the logical address indicated by the read command. For example, the memory system may execute the read command and read the data from a memory device according to the read command. In some cases, if the read command does not correspond to a sequential read command, at 435, the pattern detection may be reset. For example, the memory system may set a count value to zero for pattern detection, may remove sequential read command information from the list of logical addresses, or both.

Aspects of the process flow 400 may be implemented by a controller, among other components. Additionally or alternatively, aspects of the process flow 400 may be implemented as instructions stored in memory (e.g., firmware stored in a memory coupled with a memory system). For example, the instructions, when executed by a controller (e.g., a memory system controller), may cause the controller to perform the operations of the process flow 400.

Figure 5A:
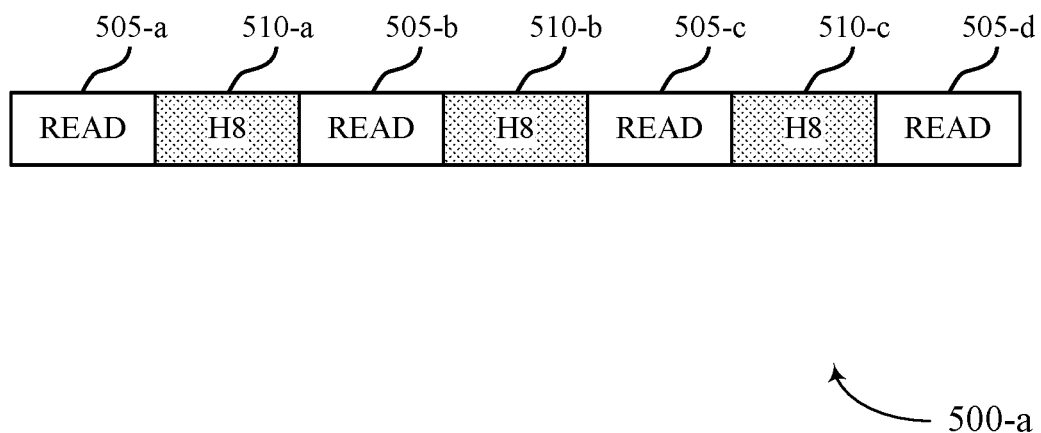
FIGS. 5A and 5B illustrate examples of sets of commands that support techniques for pre-fetching information using pattern detection in accordance with examples as disclosed herein.
Figure 5B:
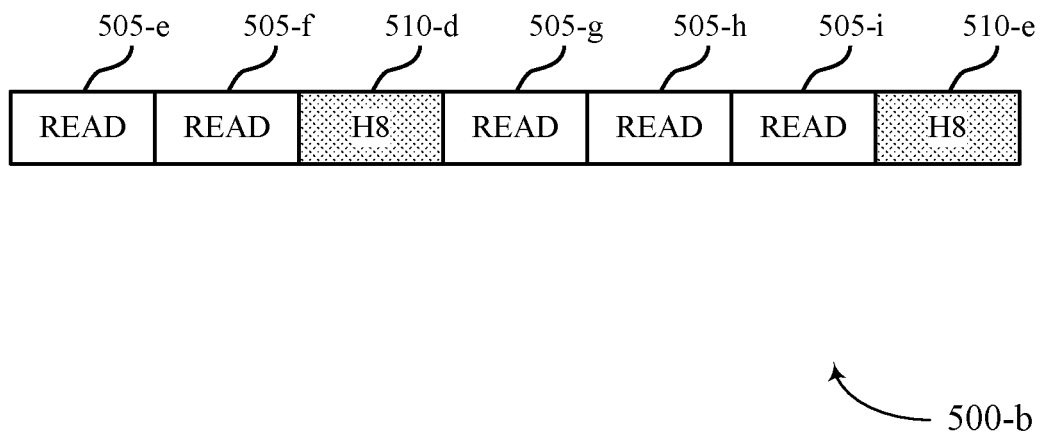

FIGS. 5A and 5B illustrate examples of sets of commands 500 that support techniques for pre-fetching information using pattern detection in accordance with examples as disclosed herein. FIG. 5A illustrates an example of a set of commands 500-*a* that may prevent pre-fetching of tables to reduce processing overhead and improve memory system efficiency. The set of commands 500-*a* may be received and executed by a memory system, such as a memory system 110 or 210 as described with reference to FIGS. 1 and 2. The memory system may store a ratio of hibernate commands 510 to other commands (e.g., sequential read commands 505) and may determine whether to pre-fetch L2P mapping tables based on (e.g., using) the ratio. The memory system may determine whether to refrain from pre-fetching information (e.g., L2P mapping tables) from one or more memory devices (e.g., memory devices 130 or 240 as described with reference to FIGS. 1 and 2) in response to comparing the stored ratio to a threshold ratio, Y.

The memory system may track the ratio of hibernate commands 510 executed to other commands executed. In some examples, the other commands may be any other commands executed by the memory system. In some other examples, the other commands included in the ratio may be subsequent read commands 505. The memory system may determine that a set of read commands 505 corresponds to a sequential pattern of read commands (e.g., using techniques described with references to FIGS. 3 and 4 or using other techniques). For example, the memory system may execute a quantity of sequential read commands satisfying a threshold, X, for detecting a sequential pattern. In some cases, the memory system may store a count value for executed hibernate commands 510 and a count value for executed subsequent read commands 505 and may calculate the ratio using the stored count values. In some examples, the memory system may reset the count values used for the ratio according to a periodicity, in response to detecting a new sequence of read commands, in response to detecting a change in command type execution at the memory system, or any combination thereof. Additionally or alternatively, the memory system may calculate ratio using hibernate commands executed within a sequence of read commands satisfying sequential pattern detection.

The memory system may compare the ratio to a threshold ratio (e.g., a threshold value) for pre-fetching a table defining an L2P mapping for a next logical address according to the sequential pattern. If the tracked ratio satisfies the threshold ratio, the memory system may determine to pre-fetch the table from one or more memory devices. However, if the tracked ratio fails to satisfy the threshold ratio, the memory system may refrain from pre-fetching the table. For example, the ratio may fail to satisfy the threshold ratio if the ratio of hibernate commands 510 to other commands (e.g., sequential read commands 505) is equal to or greater than the threshold ratio. In some examples, the threshold ratio may be 1 (e.g., a 1:1 ratio). In some other examples, the threshold ratio may have other values, where the value of the threshold ratio may be statically configured or dynamically determined. For example, a memory system may execute read command 505-*a*, hibernate command 510-*a*, read command 505-*b*, hibernate command 510-*b*, read command 505-*c*, hibernate command 510-*c*, and read command 505-*d*. Accordingly, the memory system may store a ratio of 3:4 (e.g., hibernate commands 510 to sequential read commands 505). If the threshold ratio is 1:2, the stored ratio may fail to satisfy (e.g., be less than) the threshold ratio. Accordingly, the memory system may refrain from pre-fetching L2P mapping tables in response to the ratio failing to satisfy the threshold ratio. Instead, the memory system may fetch or otherwise access the tables during execution of the corresponding read command. Because of the significant quantity of hibernate commands 510 as compared to sequential read commands 505, a memory system pre-fetching L2P tables may repeatedly pre-fetch the tables for a read command 505 and flush the tables from a cache in response to a hibernate command 510. Such a process of repeatedly pre-fetching and flushing L2P mapping tables may involve a significant processing overhead (e.g., above a threshold) and may degrade the memory system performance. Instead, because the memory system may refrain from pre-fetching the tables according to the tracked ratio, the memory system may reduce the processing overhead and improve the memory system efficiency.

FIG. 5B illustrates an example of a set of commands 500-*b* that may support pre-fetching tables to reduce latency associated with sequential read commands 505. The set of commands 500-*b* may be received and executed by a memory system, such as a memory system 110 or 210 as described with reference to FIGS. 1 and 2. The memory system may store a ratio of hibernate commands 510 to other commands (e.g., sequential read commands 505) and may determine whether to pre-fetch L2P mapping tables based on (e.g., using) the ratio. The memory system may determine whether to refrain from pre-fetching information (e.g., L2P mapping tables) from one or more memory devices (e.g., memory devices 130 or 240 as described with reference to FIGS. 1 and 2) in response to comparing the stored ratio to a threshold ratio, Y.

The memory system may execute read command 505-*e*, read command 505-*f*, hibernate command 510-*d*, read command 505-*g*, read command 505-*h*, read command 505-*i*, and hibernate command 510-*e*. Accordingly, the memory system may calculate and store a ratio of hibernate commands 510 to sequential read commands 505 of 2:5. If the threshold ratio is 1:2, the stored ratio may satisfy (e.g., be less than) the threshold ratio. Accordingly, the memory system may trigger pre-fetching of L2P mapping tables in response to the ratio satisfying the threshold ratio (e.g., if a sequential pattern of read commands 505 is detected). For example, the memory system may pre-fetch the tables if the stored ratio is equal to 0 or is otherwise less than the threshold ratio (e.g., threshold value), Y. The threshold ratio Y may be defined to differentiate between a benchmark case and a real use case. For example, a ratio less than the threshold may enable a performance mode at the memory system, in which the pattern of hibernate commands 510 may be set to a benchmark and the memory system may retrieve and save pre-fetched table data in retention RAM. A ratio greater than or equal to the threshold may enable a power mode at the memory system, in which the pattern of hibernate commands 510 may be set as normal and the memory system may refrain from pre-fetching the table data. Pre-fetched table data may be used by the memory system to support execution of a read command in the sequence of read commands. For example, a pre-fetched L2P mapping table may define an L2P mapping for one or more memory devices from which data is read. By pre-fetching the L2P mapping tables, the memory system may reduce the latency involved in executing sequential read commands.

Figure 6:
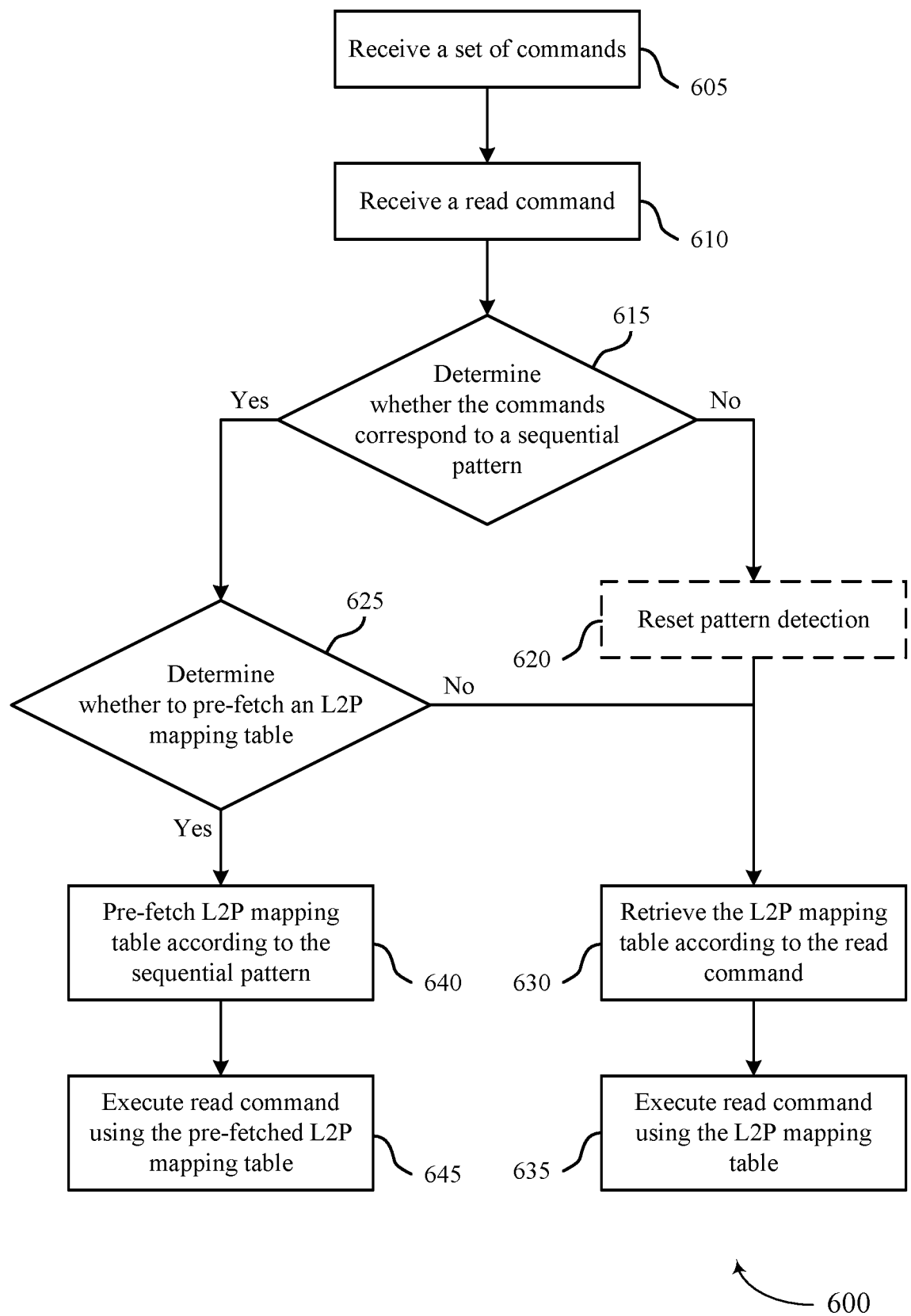
FIG. 6 illustrates an example of a process flow that supports techniques for pre-fetching information using pattern detection in accordance with examples as disclosed herein.

FIG. 6 illustrates an example of a process flow 600 that supports techniques for pre-fetching information using pattern detection in accordance with examples as disclosed herein. The process flow 600 may be implemented by a memory system, such as a memory system 110 or 210 as described with reference to FIGS. 1 and 2. The memory system may use a ratio of hibernate commands to other commands (e.g., sequential read commands) to determine whether to pre-fetch information from one or more memory devices, as described with reference to FIGS. 1, 2, and 5. By tracking, storing, and using the ratio, the memory system may refrain from performing inefficient repetitions of pre-fetching and flushing L2P mapping tables if the memory system frequently enters a hibernate state (e.g., above a threshold frequency). In some cases, alternative examples of the following may be implemented, where some operations may be performed in a different order than described or are not performed at all. Additionally or alternatively, operations may include additional features not mentioned below, or further processes may be added.

At 605, a set of commands is received. For example, a memory system may receive a set of read commands and one or more hibernate commands. The memory system may use the set of read commands for sequential pattern detection (e.g., using techniques described herein with reference to FIGS. 3 and 4 or using other techniques). The hibernate commands may trigger the memory system to enter a hibernate state (e.g., an H8 state, in which the memory system ramps down processing power). For example, executing a hibernate command may involve the memory system flushing data from a cache (e.g., into a memory device) and entering a low power state.

At 610, a read command is received. The memory system may receive the read command from a host system. At 615, it is determined whether the read commands correspond to a sequential pattern. For example, the memory system may determine if the executed read commands satisfy a threshold for sequential pattern detection.

If the read commands do not correspond to a sequential pattern, at 620, pattern detection may be reset. For example, the memory system may reset a count value for pattern detection if a received read command is not sequential to the preceding read command. Additionally or alternatively, the memory system may reset one or more count values, ratios, or both for tracking a quantity of hibernate commands.

If the read commands correspond to a sequential pattern, at 625, it is determined whether to pre-fetch an L2P mapping table. For example, the memory system may detect a sequential pattern of logical addresses using respective LBAs indicated by the set of read commands, respective transfer lengths for the set of read commands, or both. The memory system may determine whether to pre-fetch, from a memory device, a table defining an L2P address mapping for a next logical address according to the sequential pattern using a comparison between a threshold value (e.g., threshold ratio, such as 1:1) for pre-fetching the table and a ratio tracked by the memory system. The ratio tracked by the memory system may be a ratio of hibernate commands to sequential read commands in the set of commands received at 605. For example, to track the ratio, the memory system may increment a first count value for each sequential read command and increment a second count value for each hibernate command of the one or more hibernate commands, where the ratio is calculated using the second count value and the first count value.

If the ratio fails to satisfy the threshold value for pre-fetching the table, at 630, the L2P mapping table is retrieved during execution of the read command. For example, the memory system may refrain from pre-fetching the table prior to executing the read command received at 610 due to the ratio failing to satisfy the threshold value. The memory system may instead fetch (e.g., read or otherwise access) the table during execution of the read command. At 635, the read command is executed using the L2P mapping table. For example, the memory system may retrieve data from a memory device for the read command using the L2P mapping defined by the fetched table.

If the ratio satisfies the threshold value for pre-fetching the table, at 640, the L2P mapping table is pre-fetched prior to execution of the read command. For example, the memory system may pre-fetch the table prior to executing the read command received at 610 due to the ratio satisfying the threshold value. The memory system may store the pre-fetched table in a cache. At 645, the read command is executed using the pre-fetched L2P mapping table. For example, the memory system may retrieve data from a memory device for the read command using the L2P mapping defined by the pre-fetched table stored in the cache.

Aspects of the process flow 600 may be implemented by a controller, among other components. Additionally or alternatively, aspects of the process flow 600 may be implemented as instructions stored in memory (e.g., firmware stored in a memory coupled with a memory system). For example, the instructions, when executed by a controller (e.g., a memory system controller), may cause the controller to perform the operations of the process flow 600.

Figure 7:
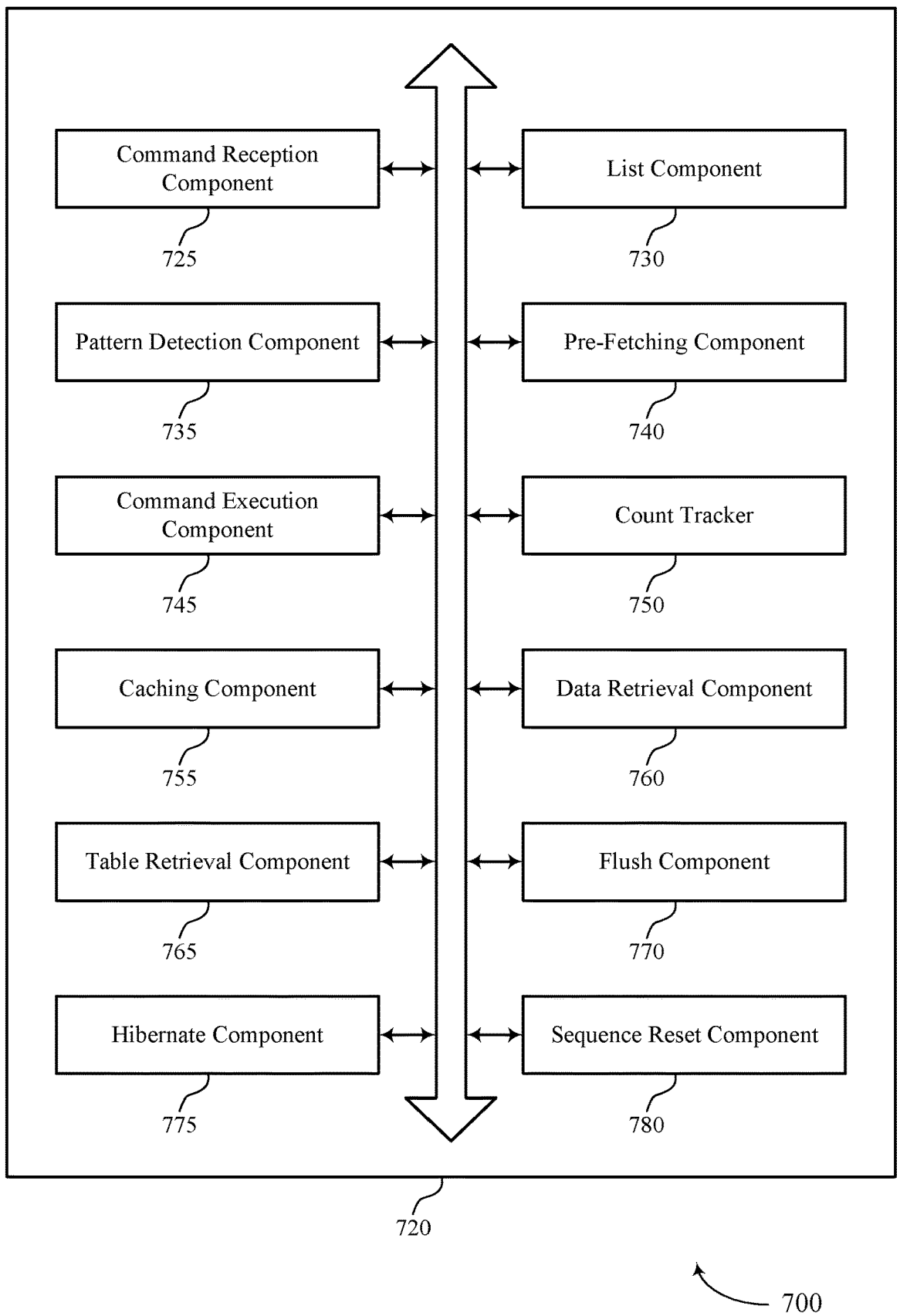
FIG. 7 shows a block diagram of a memory system that supports techniques for pre-fetching information using pattern detection in accordance with examples as disclosed herein.

FIG. 7 shows a block diagram 700 of a memory system 720 that supports techniques for pre-fetching information using pattern detection in accordance with examples as disclosed herein. The memory system 720 may be an example of aspects of a memory system as described with reference to FIGS. 1 through 6. The memory system 720, or various components thereof, may be an example of means for performing various aspects of techniques for pre-fetching information using pattern detection as described herein. For example, the memory system 720 may include a command reception component 725, a list component 730, a pattern detection component 735, a pre-fetching component 740, a command execution component 745, a count tracker 750, a caching component 755, a data retrieval component 760, a table retrieval component 765, a flush component 770, a hibernate component 775, a sequence reset component 780, or any combination thereof. Each of these components may communicate, directly or indirectly, with one another (e.g., via one or more buses).

The memory system 720 may include a memory device and a controller coupled with the memory device. The controller may cause the memory system 720 to perform one or more operations as described herein with reference to one or more of the components. The command reception component 725 may be configured as or otherwise support a means for receiving, from a host system, a plurality of read commands and one or more write-alike commands, each of the write-alike commands associated with at least one corresponding write operation by the memory device. The list component 730 may be configured as or otherwise support a means for storing a list of logical addresses indicated by the plurality of read commands according to an order of execution for the plurality of read commands. The pattern detection component 735 may be configured as or otherwise support a means for determining whether the list of logical addresses corresponds to a sequential pattern based at least in part on (e.g., using) the logical addresses indicated by the plurality of read commands, respective transfer lengths for the plurality of read commands, or both. The pre-fetching component 740 may be configured as or otherwise support a means for pre-fetching data from the memory device for a subsequent read command based at least in part on (e.g., in response to) determining that the list of logical addresses corresponds to the sequential pattern.

In some examples, the pattern detection component 735 may be configured as or otherwise support a means for determining that a quantity of sequential read commands of the plurality of read commands satisfies a threshold value for pattern detection based at least in part on (e.g., using) the list of logical addresses, where determining that the list of logical addresses corresponds to the sequential pattern is based at least in part on (e.g., in response to) the quantity of sequential read commands satisfying the threshold value for pattern detection.

In some examples, to support receiving the plurality of read commands and the one or more write-alike commands, the command reception component 725 may be configured as or otherwise support a means for receiving a first subset of sequential read commands and receiving at least one write-alike command for execution after the first subset of sequential read commands. In some such examples, the command reception component 725 may be configured as or otherwise support a means for receiving a second subset of sequential read commands for execution after the at least one write-alike command, where a first read command of the second subset of sequential read commands is sequential to a last read command of the first subset of sequential read commands. The pattern detection component 735 may be configured as or otherwise support a means for determining, based at least in part on (e.g., in response to) the first read command of the second subset of sequential read commands being sequential to the last read command of the first subset of sequential read commands, that the quantity of sequential read commands includes the first subset of sequential read commands and the second subset of sequential read commands.

In some examples, the command reception component 725 may be configured as or otherwise support a means for receiving a first read command indicating a first logical address and a first command length. In some examples, the command reception component 725 may be configured as or otherwise support a means for receiving one or more second read commands after the first read command, the one or more second read commands indicating respective second logical addresses non-sequential to the first logical address according to the first command length, where a quantity of the one or more second read commands satisfies a threshold value for resetting pattern detection. In some examples, the sequence reset component 780 may be configured as or otherwise support a means for resetting the quantity of sequential read commands based at least in part on (e.g., in response to) the one or more second read commands being non-sequential to the first read command and the quantity of the one or more second read commands satisfying the threshold value for resetting pattern detection.

In some examples, the count tracker 750 may be configured as or otherwise support a means for tracking a count value for sequential read commands, where determining that the quantity of sequential read commands satisfies the threshold value for pattern detection is based at least in part on (e.g., in response to) the count value satisfying the threshold value for pattern detection.

In some examples, the list of logical addresses includes a quantity of slots equal to the threshold value for pattern detection, where determining that the quantity of sequential read commands satisfies the threshold value for pattern detection is based at least in part on (e.g., in response to) each slot of the list of logical addresses storing a sequential logical address.

In some examples, the count tracker 750 may be configured as or otherwise support a means for tracking a second count value for sequential read commands based at least in part on (e.g., in response to) determining that the list of logical addresses corresponds to the sequential pattern. In some examples, the pre-fetching component 740 may be configured as or otherwise support a means for triggering the pre-fetching based at least in part on (e.g., in response to) the second count value satisfying a second threshold value for pre-fetch triggering.

In some examples, the caching component 755 may be configured as or otherwise support a means for storing the pre-fetched data in a cache prior to executing the subsequent read command based at least in part on (e.g., in response to) determining that the list of logical addresses corresponds to the sequential pattern. In some examples, the command execution component 745 may be configured as or otherwise support a means for executing the subsequent read command. In some examples, the caching component 755 may be configured as or otherwise support a means for retrieving the pre-fetched data from the cache for the executed subsequent read command based at least in part on (e.g., in response to) the subsequent read command satisfying the sequential pattern.

In some examples, the list component 730 may be configured as or otherwise support a means for storing a list of the respective transfer lengths for the plurality of read commands with the list of logical addresses.

In some examples, the list component 730 may be configured as or otherwise support a means for determining a common transfer length for the plurality of read commands. In some examples, the list component 730 may be configured as or otherwise support a means for storing an indication of the common transfer length with the list of logical addresses.

In some examples, the list of logical addresses is stored in RAM (e.g., an SRAM cache). In some examples, the one or more write-alike commands may include a write command, an unmap command, a format unit command, a security protocol out command, a start stop unit command, or any combination thereof.

In some examples, to support pre-fetching the data from the memory device for the subsequent read command, the pre-fetching component 740 may be configured as or otherwise support a means for executing a pre-fetch command indicating a next LBA according to the sequential pattern.

Additionally or alternatively, the command reception component 725 may be configured as or otherwise support a means for receiving a plurality of read commands and one or more hibernate commands. In some examples, the pattern detection component 735 may be configured as or otherwise support a means for detecting a sequential pattern of logical addresses based at least in part on (e.g., according to) respective logical addresses indicated by the plurality of read commands, respective transfer lengths for the plurality of read commands, or both. In some examples, the pre-fetching component 740 may be configured as or otherwise support a means for determining whether to pre-fetch, from the memory device, a table defining an L2P address mapping for a next logical address according to the sequential pattern based at least in part on (e.g., in response to) comparing a threshold value for pre-fetching the table with a ratio, the ratio being of hibernate commands to sequential read commands in the plurality of read commands. The command execution component 745 may be configured as or otherwise support a means for executing a subsequent read command based at least in part on (e.g., in response to) determining whether to pre-fetch the table.

In some examples, the pre-fetching component 740 may be configured as or otherwise support a means for pre-fetching the table prior to executing the subsequent read command based at least in part on (e.g., in response to) the ratio satisfying the threshold value for pre-fetching the table. In some examples, the caching component 755 may be configured as or otherwise support a means for storing the pre-fetched table in a cache, where, to execute the subsequent read command, the data retrieval component 760 may be configured as or otherwise support a means for retrieving data from the memory device for the executed subsequent read command based at least in part on (e.g., using) the L2P address mapping defined by the pre-fetched table stored in the cache.

In some examples, the table retrieval component 765 may be configured as or otherwise support a means for refraining from pre-fetching the table prior to executing the subsequent read command based at least in part on (e.g., in response to) the ratio failing to satisfy the threshold value for pre-fetching the table, where, to execute the subsequent read command, the table retrieval component 765 may be configured as or otherwise support a means for fetching the table based at least in part on (e.g., in response to) executing the subsequent read command. In some examples, the data retrieval component 760 may be configured as or otherwise support a means for retrieving data from the memory device for the executed subsequent read command based at least in part on (e.g., using) the L2P address mapping defined by the fetched table.

In some examples, the command execution component 745 may be configured as or otherwise support a means for executing a hibernate command of the one or more hibernate commands. In some examples, the flush component 770 may be configured as or otherwise support a means for flushing data from a cache into the memory device based at least in part on (e.g., in response to) executing the hibernate command. In some examples, the hibernate component 775 may be configured as or otherwise support a means for entering a low power state based at least in part on (e.g., in response to) executing the hibernate command.

In some examples, the count tracker 750 may be configured as or otherwise support a means for incrementing a first count value for each sequential read command of the plurality of read commands. In some examples, the count tracker 750 may be configured as or otherwise support a means for incrementing a second count value for each hibernate command of the one or more hibernate commands, where the ratio is determined based at least in part on (e.g., calculated using) the second count value and the first count value.

In some examples, the threshold value for pre-fetching the table may be a threshold ratio of 1:1.

Figure 8:
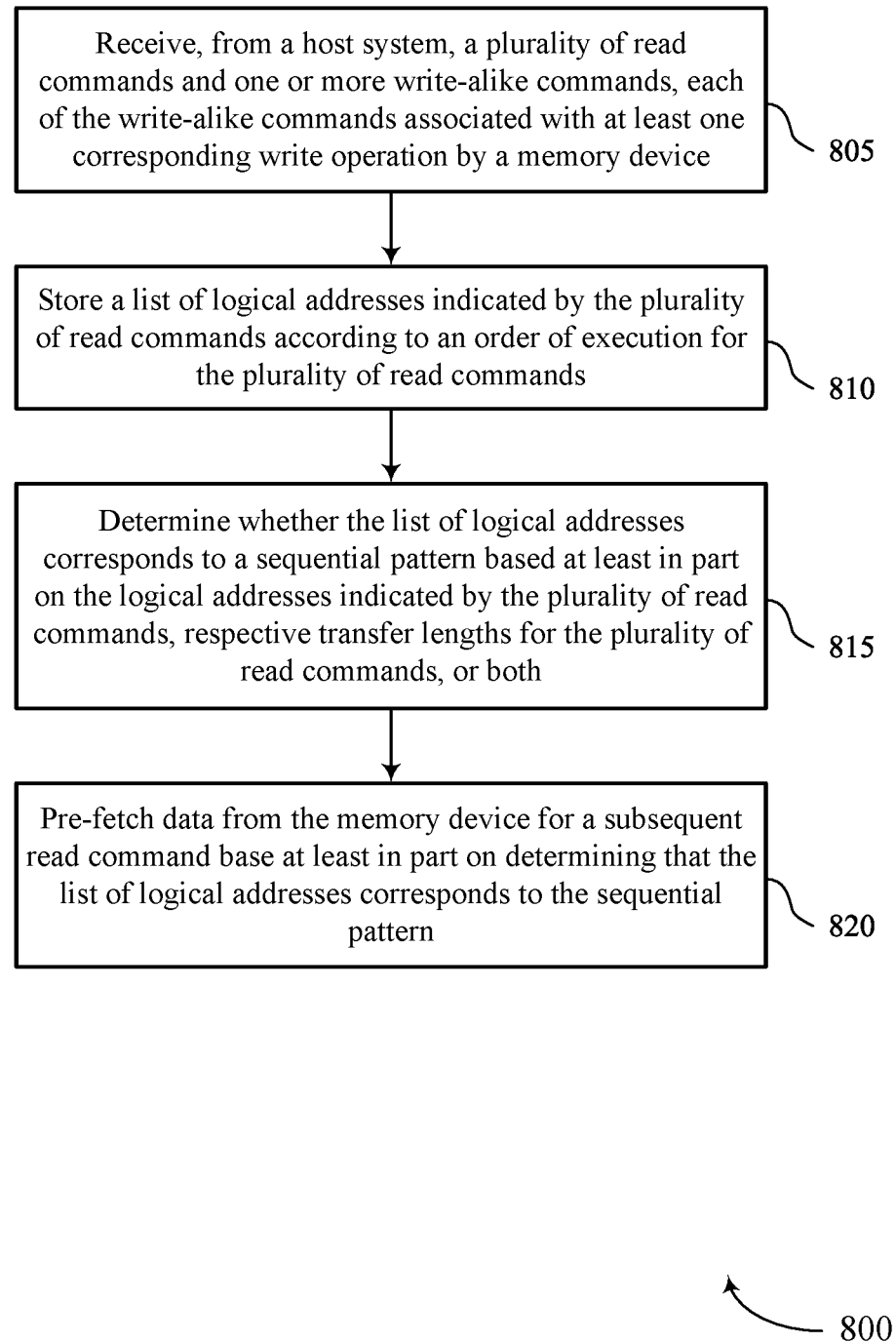
FIGS. 8 and 9 show flowcharts illustrating methods that support techniques for pre-fetching information using pattern detection in accordance with examples as disclosed herein.

FIG. 8 shows a flowchart illustrating a method 800 that supports techniques for pre-fetching information using pattern detection in accordance with examples as disclosed herein. The operations of method 800 may be implemented by a memory system or its components as described herein. For example, the operations of method 800 may be performed by a memory system as described with reference to FIGS. 1 through 7. In some examples, a memory system may execute a set of instructions to control the functional elements of the system to perform the described functions. Additionally or alternatively, the memory system may perform aspects of the described functions using special-purpose hardware.

At 805, the method may include receiving, from a host system, a plurality of read commands and one or more write-alike commands, each of the write-alike commands associated with at least one corresponding write operation by a memory device. The operations of 805 may be performed in accordance with examples as disclosed herein. In some examples, aspects of the operations of 805 may be performed by a command reception component 725 as described with reference to FIG. 7.

At 810, the method may include storing a list of logical addresses indicated by the plurality of read commands according to an order of execution for the plurality of read commands. The operations of 810 may be performed in accordance with examples as disclosed herein. In some examples, aspects of the operations of 810 may be performed by a list component 730 as described with reference to FIG. 7.

At 815, the method may include determining whether the list of logical addresses corresponds to a sequential pattern based at least in part on (e.g., using) the logical addresses indicated by the plurality of read commands, respective transfer lengths for the plurality of read commands, or both. The operations of 815 may be performed in accordance with examples as disclosed herein. In some examples, aspects of the operations of 815 may be performed by a pattern detection component 735 as described with reference to FIG. 7.

At 820, the method may include pre-fetching data from the memory device for a subsequent read command based at least in part on (e.g., in response to) determining that the list of logical addresses corresponds to the sequential pattern. The operations of 820 may be performed in accordance with examples as disclosed herein. In some examples, aspects of the operations of 820 may be performed by a pre-fetching component 740 as described with reference to FIG. 7.

In some examples, an apparatus as described herein may perform a method or methods, such as the method 800. The apparatus may include, features, circuitry, logic, means, or instructions (e.g., a non-transitory computer-readable medium storing instructions executable by a processor) for receiving, from a host system, a plurality of read commands and one or more write-alike commands, each of the write-alike commands associated with at least one corresponding write operation by a memory device, storing a list of logical addresses indicated by the plurality of read commands according to an order of execution for the plurality of read commands, determining whether the list of logical addresses corresponds to a sequential pattern based at least in part on (e.g., using) the logical addresses indicated by the plurality of read commands, respective transfer lengths for the plurality of read commands, or both, and pre-fetching data from the memory device for a subsequent read command based at least in part on (e.g., in response to) determining that the list of logical addresses corresponds to the sequential pattern.

Some examples of the method 800 and the apparatus described herein may further include operations, features, circuitry, logic, means, or instructions for determining that a quantity of sequential read commands of the plurality of read commands satisfies a threshold value for pattern detection based at least in part on (e.g., according to) the list of logical addresses, where determining that the list of logical addresses corresponds to the sequential pattern may be based at least in part on (e.g., in response to) the quantity of sequential read commands satisfying the threshold value for pattern detection.

In some examples of the method 800 and the apparatus described herein, operations, features, circuitry, logic, means, or instructions for receiving the plurality of read commands and the one or more write-alike commands may include operations, features, circuitry, logic, means, or instructions for receiving a first subset of sequential read commands, receiving at least one write-alike command for execution after the first subset of sequential read commands, receiving a second subset of sequential read commands for execution after the at least one write-alike command, where a first read command of the second subset of sequential read commands may be sequential to a last read command of the first subset of sequential read commands, and determining, based at least in part on (e.g., in response to) the first read command of the second subset of sequential read commands being sequential to the last read command of the first subset of sequential read commands, that the quantity of sequential read commands includes the first subset of sequential read commands and the second subset of sequential read commands.

Some examples of the method 800 and the apparatus described herein may further include operations, features, circuitry, logic, means, or instructions for receiving a first read command indicating a first logical address and a first command length, receiving one or more second read commands after the first read command, the one or more second read commands indicating respective second logical addresses non-sequential to the first logical address according to the first command length, where a quantity of the one or more second read commands satisfies a threshold value for resetting pattern detection, and resetting the quantity of sequential read commands based at least in part on (e.g., in response to) the one or more second read commands being non-sequential to the first read command and the quantity of the one or more second read commands satisfying the threshold value for resetting pattern detection.

Some examples of the method 800 and the apparatus described herein may further include operations, features, circuitry, logic, means, or instructions for tracking a count value for sequential read commands, where determining that the quantity of sequential read commands satisfies the threshold value for pattern detection may be based at least in part on (e.g., in response to) the count value satisfying the threshold value for pattern detection.

In some examples of the method 800 and the apparatus described herein, the list of logical addresses includes a quantity of slots equal to the threshold value for pattern detection, where determining that the quantity of sequential read commands satisfies the threshold value for pattern detection may be based at least in part on (e.g., in response to) each slot of the list of logical addresses storing a sequential logical address.

Some examples of the method 800 and the apparatus described herein may further include operations, features, circuitry, logic, means, or instructions for tracking a second count value for sequential read commands based at least in part on (e.g., in response to) determining that the list of logical addresses corresponds to the sequential pattern and triggering the pre-fetching based at least in part on (e.g., in response to) the second count value satisfying a second threshold value for pre-fetch triggering.

Some examples of the method 800 and the apparatus described herein may further include operations, features, circuitry, logic, means, or instructions for storing the pre-fetched data in a cache prior to executing the subsequent read command based at least in part on (e.g., in response to) determining that the list of logical addresses corresponds to the sequential pattern, executing the subsequent read command, and retrieving the pre-fetched data from the cache for the executed subsequent read command based at least in part on (e.g., due to) the subsequent read command satisfying the sequential pattern.

Some examples of the method 800 and the apparatus described herein may further include operations, features, circuitry, logic, means, or instructions for storing a list of the respective transfer lengths for the plurality of read commands with the list of logical addresses.

Some examples of the method 800 and the apparatus described herein may further include operations, features, circuitry, logic, means, or instructions for determining a common transfer length for the plurality of read commands and storing an indication of the common transfer length with the list of logical addresses.

In some examples of the method 800 and the apparatus described herein, the list of logical addresses may be stored in RAM.

In some examples of the method 800 and the apparatus described herein, the one or more write-alike commands may include a write command, an unmap command, a format unit command, a security protocol out command, a start stop unit command, or any combination thereof.

In some examples of the method 800 and the apparatus described herein, pre-fetching the data from the memory device for the subsequent read command may include operations, features, circuitry, logic, means, or instructions for executing a pre-fetch command indicating a next LBA according to the sequential pattern.

Figure 9:
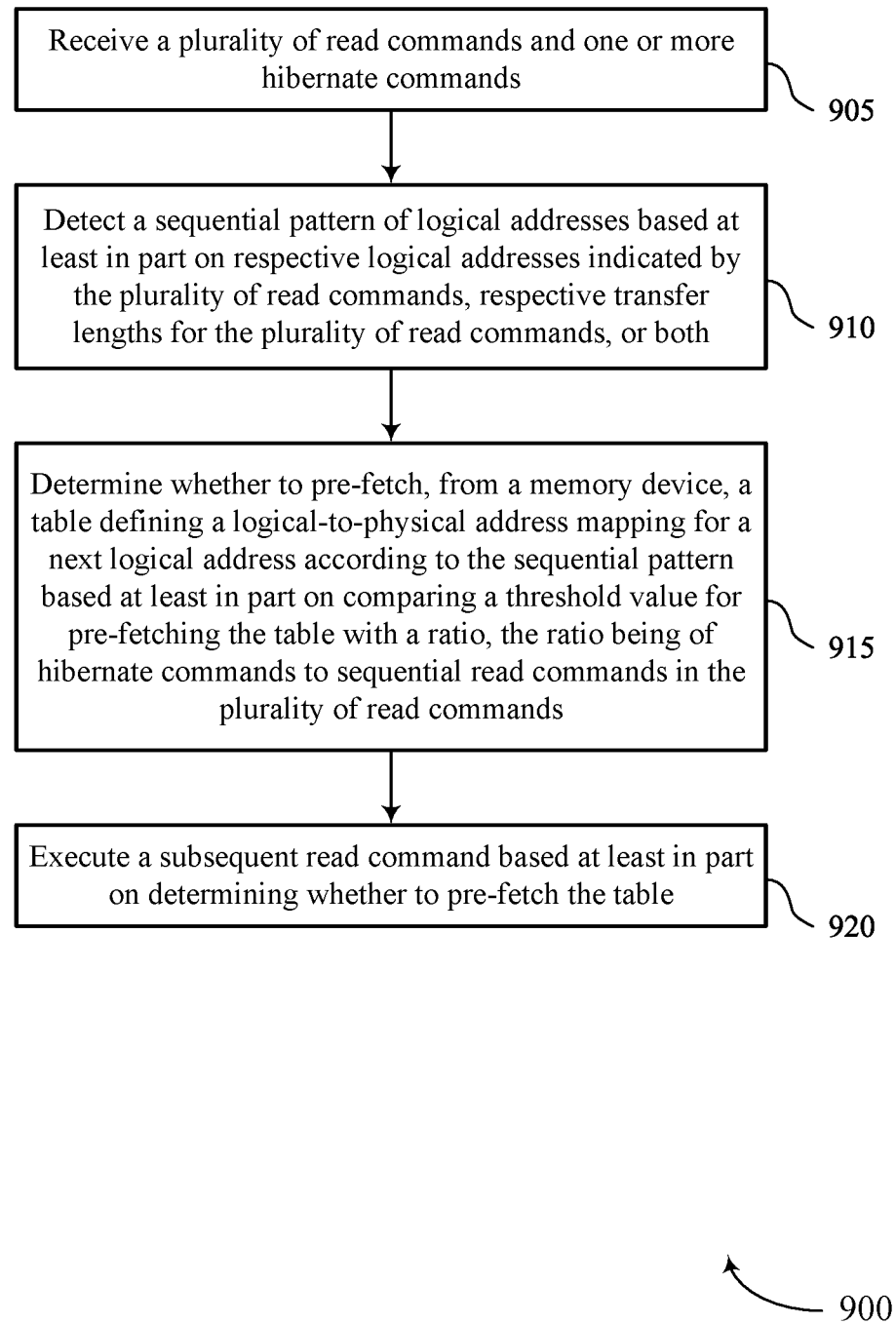

FIG. 9 shows a flowchart illustrating a method 900 that supports techniques for pre-fetching information using pattern detection in accordance with examples as disclosed herein. The operations of method 900 may be implemented by a memory system or its components as described herein. For example, the operations of method 900 may be performed by a memory system as described with reference to FIGS. 1 through 7. In some examples, a memory system may execute a set of instructions to control the functional elements of the system to perform the described functions. Additionally or alternatively, the memory system may perform aspects of the described functions using special-purpose hardware.

At 905, the method may include receiving a plurality of read commands and one or more hibernate commands. The operations of 905 may be performed in accordance with examples as disclosed herein. In some examples, aspects of the operations of 905 may be performed by a command reception component 725 as described with reference to FIG. 7.

At 910, the method may include detecting a sequential pattern of logical addresses based at least in part on (e.g., using) respective logical addresses indicated by the plurality of read commands, respective transfer lengths for the plurality of read commands, or both. The operations of 910 may be performed in accordance with examples as disclosed herein. In some examples, aspects of the operations of 910 may be performed by a pattern detection component 735 as described with reference to FIG. 7.

At 915, the method may include determining whether to pre-fetch, from a memory device, a table defining an L2P address mapping for a next logical address according to the sequential pattern based at least in part on (e.g., in response to) comparing a threshold value for pre-fetching the table with a ratio, the ratio being of hibernate commands to sequential read commands in the plurality of read commands. The operations of 915 may be performed in accordance with examples as disclosed herein. In some examples, aspects of the operations of 915 may be performed by a pre-fetching component 740 as described with reference to FIG. 7.

At 920, the method may include executing a subsequent read command based at least in part on (e.g., according to) determining whether to pre-fetch the table. The operations of 920 may be performed in accordance with examples as disclosed herein. In some examples, aspects of the operations of 920 may be performed by a command execution component 745 as described with reference to FIG. 7.

In some examples, an apparatus as described herein may perform a method or methods, such as the method 900. The apparatus may include, features, circuitry, logic, means, or instructions (e.g., a non-transitory computer-readable medium storing instructions executable by a processor) for receiving a plurality of read commands and one or more hibernate commands, detecting a sequential pattern of logical addresses based at least in part on respective logical addresses indicated by the plurality of read commands, respective transfer lengths for the plurality of read commands, or both, determining whether to pre-fetch, from a memory device, a table defining an L2P address mapping for a next logical address according to the sequential pattern based at least in part on comparing a threshold value for pre-fetching the table with a ratio, the ratio being of hibernate commands to sequential read commands in the plurality of read commands, and executing a subsequent read command based at least in part on determining whether to pre-fetch the table.

Some examples of the method 900 and the apparatus described herein may further include operations, features, circuitry, logic, means, or instructions for pre-fetching the table prior to executing the subsequent read command based at least in part on (e.g., in response to) the ratio satisfying the threshold value for pre-fetching the table and storing the pre-fetched table in a cache, where executing the subsequent read command may include operations, features, circuitry, logic, means, or instructions for retrieving data from the memory device for the executed subsequent read command based at least in part on (e.g., using) the L2P address mapping defined by the pre-fetched table stored in the cache.

Some examples of the method 900 and the apparatus described herein may further include operations, features, circuitry, logic, means, or instructions for refraining from pre-fetching the table prior to executing the subsequent read command based at least in part on (e.g., in response to) the ratio failing to satisfy the threshold value for pre-fetching the table, where executing the subsequent read command may include operations, features, circuitry, logic, means, or instructions for fetching the table based at least in part on (e.g., in response to) executing the subsequent read command and retrieving data from the memory device for the executed subsequent read command based at least in part on (e.g., using) the L2P address mapping defined by the fetched table.

Some examples of the method 900 and the apparatus described herein may further include operations, features, circuitry, logic, means, or instructions for executing a hibernate command of the one or more hibernate commands, flushing data from a cache into the memory device based at least in part on (e.g., in response to) executing the hibernate command, and entering a low power state based at least in part on (e.g., in response to) executing the hibernate command.

Some examples of the method 900 and the apparatus described herein may further include operations, features, circuitry, logic, means, or instructions for incrementing a first count value for each sequential read command of the plurality of read commands and incrementing a second count value for each hibernate command of the one or more hibernate commands, where the ratio may be determined based at least in part on (e.g., using) the second count value and the first count value.

In some examples of the method 900 and the apparatus described herein, the threshold value for pre-fetching the table may be a threshold ratio of 1:1.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or technologies such as infrared, radio, and microwave, then the coaxial cable, fiber optic cable, twisted pair, DSL, or technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
   one or more memory devices; and
   processing circuitry coupled with the one or more memory devices and configured to cause the memory system to:
   receive, from a host system, a plurality of read commands and one or more write-alike commands, each of the one or more write-alike commands associated with at least one corresponding write operation by the one or more memory devices;
   store a list of logical addresses indicated by a first subset of read commands of the plurality of read commands and a second subset of read commands of the plurality of read commands according to an order of execution for the plurality of read commands, wherein the storing is based at least in part on the first subset of read commands and the second subset of read commands being separated by at least one write-alike command of the one or more write-alike commands;

determine whether the list of logical addresses corresponds to a sequential pattern based at least in part on the logical addresses indicated by the first subset of read commands and the second subset of read commands, respective transfer lengths for the plurality of read commands, or both; and pre-fetch data from the one or more memory devices for a subsequent read command based at least in part on determining that the list of logical addresses corresponds to the sequential pattern.

2. The memory system of claim 1, wherein the processing circuitry is further configured to cause the memory system to:

determine that a quantity of sequential read commands of the plurality of read commands satisfies a threshold value for pattern detection based at least in part on the list of logical addresses, wherein the processing circuitry is configured to cause the memory system to determine that the list of logical addresses corresponds to the sequential pattern based at least in part on the quantity of sequential read commands satisfying the threshold value for pattern detection.

3. The memory system of claim 2, wherein, to receive the plurality of read commands and the one or more write-alike commands, the processing circuitry is configured to cause the memory system to:

receive the first subset of read commands, wherein the first subset of read commands comprises sequential read commands;

receive the at least one write-alike command for execution after the first subset of read commands;

receive the second subset of read commands for execution after the at least one write-alike command, wherein the second subset of read commands comprises sequential read commands, and wherein a first read command of the second subset of read commands is sequential to a last read command of the first subset of read commands; and determine, based at least in part on the first read command of the second subset of read commands being sequential to the last read command of the first subset of read commands, that the quantity of sequential read commands comprises the first subset of read commands and the second subset of read commands.

4. The memory system of claim 2, wherein the processing circuitry is further configured to cause the memory system to:

receive a first read command indicating a first logical address and a first command length;

receive one or more second read commands after the first read command, the one or more second read commands indicating respective second logical addresses non-sequential to the first logical address according to the first command length, wherein a quantity of the one or more second read commands satisfies a threshold value for resetting pattern detection; and reset the quantity of sequential read commands based at least in part on the one or more second read commands being non-sequential to the first read command and the quantity of the one or more second read commands satisfying the threshold value for resetting pattern detection.

5. The memory system of claim 2, wherein the processing circuitry is further configured to cause the memory system to:

track a count value for sequential read commands, wherein the processing circuitry is configured to cause the memory system to determine that the quantity of sequential read commands satisfies the threshold value for pattern detection based at least in part on the count value satisfying the threshold value for pattern detection.

6. The memory system of claim 2, wherein the list of logical addresses comprises a quantity of slots equal to the threshold value for pattern detection, and wherein the processing circuitry is configured to cause the memory system to determine that the quantity of sequential read commands satisfies the threshold value for pattern detection based at least in part on each slot of the list of logical addresses storing a sequential logical address.

7. The memory system of claim 1, wherein the processing circuitry is further configured to cause the memory system to:

track a second count value for sequential read commands based at least in part on determining that the list of logical addresses corresponds to the sequential pattern; and trigger the pre-fetching based at least in part on the second count value satisfying a second threshold value for pre-fetch triggering.

8. The memory system of claim 1, wherein the processing circuitry is further configured to cause the memory system to:

store the pre-fetched data in a cache prior to executing the subsequent read command based at least in part on determining that the list of logical addresses corresponds to the sequential pattern;

execute the subsequent read command; and retrieve the pre-fetched data from the cache for the executed subsequent read command based at least in part on the subsequent read command satisfying the sequential pattern.

9. The memory system of claim 1, wherein the processing circuitry is further configured to cause the memory system to:

store a list of the respective transfer lengths for the plurality of read commands with the list of logical addresses.

10. The memory system of claim 1, wherein the processing circuitry is further configured to cause the memory system to:

determine a common transfer length for the plurality of read commands; and store an indication of the common transfer length with the list of logical addresses.

11. The memory system of claim 1, wherein the processing circuitry is further configured to cause the memory system to:

store the list of logical addresses in random access memory.

12. The memory system of claim 1, wherein the one or more write-alike commands comprise a write command, an unmap command, a format unit command, a security protocol out command, a start stop unit command, or any combination thereof.

13. The memory system of claim 1, wherein, to pre-fetch the data from the one or more memory devices for the subsequent read command, the processing circuitry is configured to cause the memory system to:

execute a pre-fetch command indicating a next logical block address according to the sequential pattern.

14. A non-transitory computer-readable medium storing code comprising instructions which, when executed by processing circuitry of an electronic device, cause the electronic device to:

receive, from a host system, a plurality of read commands and one or more write-alike commands, each of the one or more write-alike commands associated with at least one corresponding write operation by a memory device;

store a list of logical addresses indicated by a first subset of read commands of the plurality of read commands and a second subset of read commands of the plurality of read commands according to an order of execution for the plurality of read commands, wherein the storing is based at least in part on the first subset of read commands and the second subset of read commands being separated by at least one write-alike command of the one or more write-alike commands;

determine whether the list of logical addresses corresponds to a sequential pattern based at least in part on the logical addresses indicated by the first subset of read commands and the second subset of read commands, respective transfer lengths for the plurality of read commands, or both; and pre-fetch data from the memory device for a subsequent read command based at least in part on determining that the list of logical addresses corresponds to the sequential pattern.

15. The non-transitory computer-readable medium of claim 14, wherein the instructions, when executed by the processing circuitry of the electronic device, further cause the electronic device to:

determine that a quantity of sequential read commands of the plurality of read commands satisfies a threshold value for pattern detection based at least in part on the list of logical addresses, wherein the instructions cause the electronic device to determine that the list of logical addresses corresponds to the sequential pattern based at least in part on the quantity of sequential read commands satisfying the threshold value for pattern detection.

16. The non-transitory computer-readable medium of claim 15, wherein, to receive the plurality of read commands and the one or more write-alike commands, the instructions, when executed by the processing circuitry of the electronic device, further cause the electronic device to:

receive the first subset of read commands, wherein the first subset of read commands comprises sequential read commands;

receive the at least one write-alike command for execution after the first subset of read commands;

receive the second subset of read commands for execution after the at least one write-alike command, wherein the second subset of read commands comprises sequential read commands, and wherein a first read command of the second subset of read commands is sequential to a last read command of the first subset of read commands; and determine, based at least in part on the first read command of the second subset of read commands being sequential to the last read command of the first subset of read commands, that the quantity of sequential read commands comprises the first subset of read commands and the second subset of read commands.

17. The non-transitory computer-readable medium of claim 15, wherein the instructions, when executed by the processing circuitry of the electronic device, further cause the electronic device to:

receive a first read command indicating a first logical address and a first command length;

receive one or more second read commands after the first read command, the one or more second read commands indicating respective second logical addresses non-sequential to the first logical address according to the first command length, wherein a quantity of the one or more second read commands satisfies a threshold value for resetting pattern detection; and reset the quantity of sequential read commands based at least in part on the one or more second read commands being non-sequential to the first read command and the quantity of the one or more second read commands satisfying the threshold value for resetting pattern detection.

18. The non-transitory computer-readable medium of claim 15, wherein the instructions, when executed by the processing circuitry of the electronic device, further cause the electronic device to:

track a count value for sequential read commands, wherein the instructions cause the electronic device to determine that the quantity of sequential read commands satisfies the threshold value for pattern detection based at least in part on the count value satisfying the threshold value for pattern detection.

19. The non-transitory computer-readable medium of claim 15, wherein the list of logical addresses comprises a quantity of slots equal to the threshold value for pattern detection, and wherein the instructions cause the electronic device to determine that the quantity of sequential read commands satisfies the threshold value for pattern detection based at least in part on each slot of the list of logical addresses storing a sequential logical address.

20. The non-transitory computer-readable medium of claim 14, wherein the instructions, when executed by the processing circuitry of the electronic device, further cause the electronic device to:

track a second count value for sequential read commands based at least in part on determining that the list of logical addresses corresponds to the sequential pattern; and trigger the pre-fetching based at least in part on the second count value satisfying a second threshold value for pre-fetch triggering.

* * * * *